United States Patent
Følkner

(10) Patent No.: US 9,512,929 B2
(45) Date of Patent: Dec. 6, 2016

(54) PRESSURE BALANCED ROTATION SPOOL VALVE

(75) Inventor: Stein Følkner, Hosle (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 315 days.

(21) Appl. No.: 13/980,947

(22) PCT Filed: Jan. 26, 2012

(86) PCT No.: PCT/EP2012/051231
§ 371 (c)(1),
(2), (4) Date: Oct. 18, 2013

(87) PCT Pub. No.: WO2012/101214
PCT Pub. Date: Aug. 2, 2012

(65) Prior Publication Data
US 2014/0034168 A1    Feb. 6, 2014

(30) Foreign Application Priority Data

Jan. 28, 2011 (NO) .................................. 20110139

(51) Int. Cl.
| | |
|---|---|
| *F04F 1/02* | (2006.01) |
| *F16K 11/076* | (2006.01) |
| *F04F 1/00* | (2006.01) |
| *F16K 11/085* | (2006.01) |

(52) U.S. Cl.
CPC ............... *F16K 11/076* (2013.01); *F04F 1/00* (2013.01); *F04F 1/02* (2013.01); *F16K 11/0856* (2013.01); *Y10T 137/8671* (2015.04)

(58) Field of Classification Search
CPC ....... F16K 11/076; F16K 11/0856; F04F 1/00; F04F 1/02
USPC .......... 137/625.16, 625.23, 625.24; 417/118, 417/120, 122, 137
See application file for complete search history.

(56) References Cited

U.S. PATENT DOCUMENTS

| | | | | |
|---|---|---|---|---|
| 2,980,138 | A | * | 4/1961 | Detweiler ............. F15B 19/005 137/624.13 |
| 3,423,934 | A | * | 1/1969 | Mercier ................. B62D 5/097 180/436 |
| 3,580,287 | A | * | 5/1971 | McLaughlin ........... B29C 45/14 137/625.69 |

(Continued)

FOREIGN PATENT DOCUMENTS

| | | |
|---|---|---|
| DE | 10 2006 011 580 B3 | 10/2007 |
| DE | 10 2007 035 969 A1 | 2/2009 |
| EP | 2 075 421 A1 | 7/2009 |

*Primary Examiner* — Mary McManmon
*Assistant Examiner* — Richard K Durden

(57) ABSTRACT

The present invention regards a valve arrangement comprising a housing and a mainly cylindrical valve element arranged rotatable within the housing, wherein the housing has at least one supply port, at least one exhaust port and at least one outlet/inlet opening. These ports and opening are arranged at a distance from each other along a rotation axis of the valve element. The valve element comprises at least one first bore extending along the rotation axis connecting the supply port with the at least one outlet/inlet opening in one position of the valve element, and at least one second bore extending along the rotation axis connecting the same outlet/inlet opening with the exhaust port in a second position of the valve element, the bores being configured such that they are separated from each other.

10 Claims, 3 Drawing Sheets

(56) References Cited

U.S. PATENT DOCUMENTS

| | | |
|---|---|---|
| 3,969,046 A | 7/1976 | Wynn |
| 4,469,342 A * | 9/1984 | Millard .................. B62D 5/083 |
| | | 137/625.24 |
| 4,986,307 A | 1/1991 | Hardee |
| 7,322,375 B2 * | 1/2008 | Goldfarb ............... F16K 11/085 |
| | | 137/625.22 |
| 2004/0173510 A1 | 9/2004 | Jung |
| 2006/0096644 A1 | 5/2006 | Goldfarb et al. |

* cited by examiner

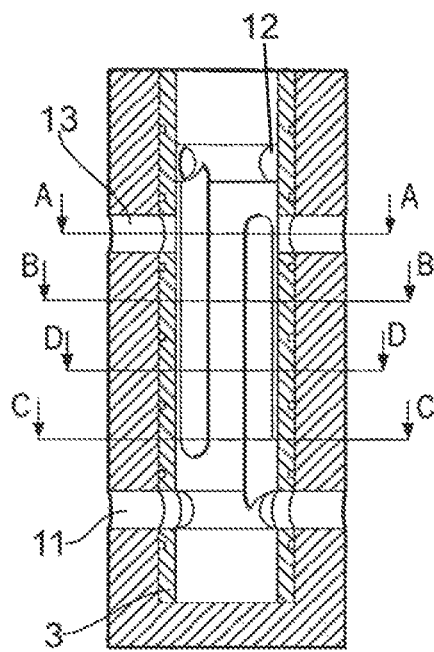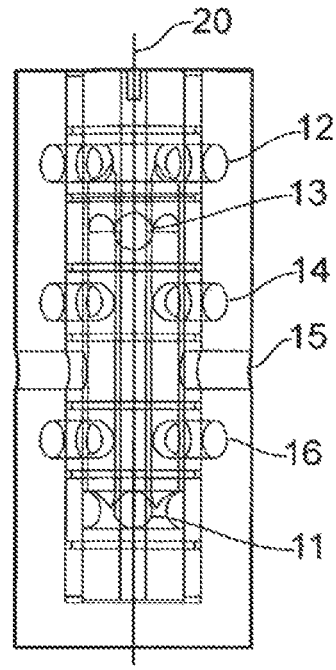
FIG. 2　　　　　FIG. 3
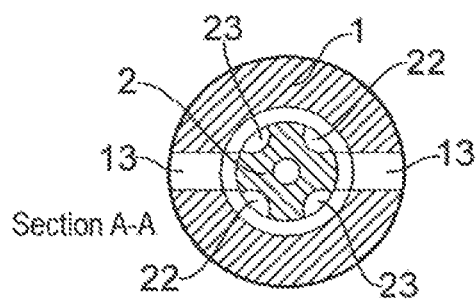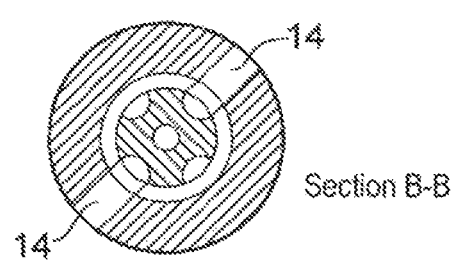
FIG. 4a　　　　　FIG. 4b
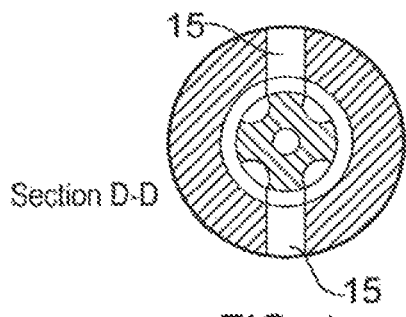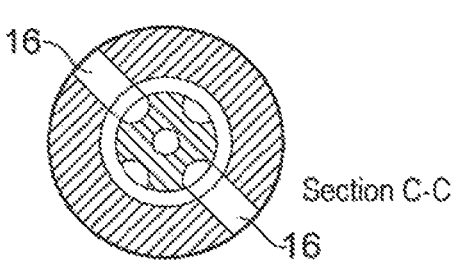
FIG. 4c　　　　　FIG. 4d
FIG. 4

PRESSURE BALANCED ROTATION SPOOL VALVE

BACKGROUND OF THE INVENTION

The present invention relates to a valve arrangement.

There is sometimes a need to coordinate several fluid flows, which may be done by operating several valves at the same time with a common control system. However, there may also be a need to be sure that the operation is synchronized. One such solution is described in U.S. Pat. No. 3,969,046, describing a metering pump system, where in relation to the system there is described a valve arrangement with a valve housing and a valve element rotatable within the valve housing. The valve element is formed with indentations in its surface such that during the rotation of the valve element, it connects an inlet with a common outlet/inlet opening and closes an outlet, and in another position it connects the outlet with the common outlet/inlet opening and closes the inlet.

The present invention gives an alternative solution to this problem with a valve arrangement as defined in the attached claims.

SUMMARY OF THE INVENTION

In accordance with the present invention there is provided a valve arrangement comprising a housing and a mainly cylindrical valve element arranged rotatable within the housing. The valve housing has at least one supply port, at least one exhaust port and at least one outlet/inlet opening arranged at a distance from each other along a rotation axis of the valve element.

There is at least one supply port, forming a supply port set, where the set is formed by one, two or more supply ports. If there are more than one supply ports in the set, these are arranged around one circumference of the valve element. The supply ports are then arranged lined up one after another around one circumference of the valve element, where the circumference is arranged coaxial with a rotation axis of the valve element. A fluid will normally flow through the supply ports and into the valve element. In a similar manner there are arranged at least one exhaust port, forming a set of exhaust ports, there being one, two, three or more exhaust ports arranged around a circumference of the valve element. A fluid will normally flow from the valve element and out through the exhaust port. The at least one outlet/inlet opening may be more than one outlet/inlet opening forming a set of outlets/inlets, where a set is defined in a similar manner as in relation to the supply port and the exhaust port. There may also be arranged one, two, three, four or more sets of outlet/inlet openings, where these sets are arranged at a distance from each other along the rotation axis of the valve element. These sets may then not only comprise one outlet/inlet opening each, but possibly also two openings each or four openings each. There may in each set be an equal amount of inlet/outlet openings, or there may be different amounts of inlet/outlet openings in different sets. Each set of inlet/outlet openings is arranged around one circumference of the valve element. If there is more than one opening in a set of inlet/outlet openings, the openings will normally be spaced a mainly equal distance around the circumference of the valve element. The openings in one set of inlet/outlet openings will normally be arranged at different angles around the valve housing compared with the inlet/outlet openings in a neighboring set of inlet/outlet openings. Openings of different sets are thereby staggered around in the valve housing.

Further, according to the invention the valve element comprises at least one first bore extending along the rotation axis connecting the supply port with the at least one outlet/inlet opening in one position of the valve element, and at least one second bore extending along the rotation axis connecting the at least one outlet/inlet opening with the exhaust port in another position of the valve element, the bores being configured such that they are separated from each other. A bore in the valve element will never connect the supply port with the exhaust port.

According to an aspect of the invention, there may be at least two outlet/inlet opening sets in the valve housing arranged at a distance from each other as seen along a rotation axis of the valve element. These outlet/inlet opening sets lead to/from different units outside the valve arrangement. The outlet/inlet opening sets, when there are at least two of them, and the bores, are configured such that the first bore in one position of the valve element is in contact with one of the outlet/inlet opening sets and in another position of the valve element is in contact with a second outlet/inlet opening set. The outlet/inlet opening sets and the first and second bores are configured such that in one position of the valve element they are in contact with one outlet/inlet opening set, and in another position of the valve element they are in contact with another outlet/inlet opening set axially displaced in the housing compared with the one outlet/inlet opening set.

According to another aspect the at least one outlet/inlet opening set may be arranged between the supply port and the exhaust port as seen along a rotation axis for the valve element.

According to another aspect the bores may be formed as grooves in an outer surface of the valve element. Another embodiment is to have the bores formed within the valve element.

According to another aspect the valve element may comprise a circumferential groove connecting the supply port with the first bore, and a second circumferential groove connecting the exhaust port with the second bore. In another embodiment this circumferential groove may be formed in an inner surface of the valve housing. With such a groove either in the valve element or the valve housing there may be only one supply port and one exhaust port. With only one supply port and the groove in the outer surface of the valve element or in the inner surface of the valve housing, there will always be a feed of fluid to the first bore in the valve element.

According to another aspect, there may be two first bores arranged on opposite sides of the valve element and two second bores arranged on opposite sides of the valve element. The bores are then arranged at equal distances from each other. The bores are arranged such that the two first bores are arranged at 0 degrees and 180 degrees and the two second bores are arranged at 90 degrees and 270 degrees when seen in a cross section. A first bore has a second bore as a neighboring bore on both sides as seen in a direction around the circumference, and a second bore has a first bore as a neighboring bore on both sides. Around the circumference there are alternating first and second bores. Such a solution will provide a pressure balanced rotating valve arrangement. Equal grooves on opposite sides for fluid either coming from the supply port or leaving through the exhaust port will induce equal pressure forces acting on the valve element in a radial direction.

According to another aspect there may be arranged outlet/inlet opening sets connectable to two different units in the valve housing, where the outlet/inlet opening set connectable to a first unit is staggered around the housing in relation to the outlet/inlet opening set connectable to a second unit, thereby leading fluid towards/away from one unit in a first position of the valve element and then in a second position of the valve element leading fluid towards/away from a second unit. Outlet/inlet opening sets leading to/from different external units will be positioned at different axial positions in the valve housing. If there are two first grooves there will preferably also be two outlet/inlet openings leading to the same external unit, but positioned at the same axial position in the housing.

According to another aspect, the housing may have one set with two supply ports, one set with two exhaust ports and at least one set with two outlet/inlet openings, where the openings of each of these sets are arranged at opposite sides around a circumference of the valve housing in relation to each other. Another possibility is to have sets with three openings and also have three first and second grooves in the valve element, where these three openings are arranged at equal distances around the circumference. Yet another possibility is to have sets with four openings, and four or possibly two first and second grooves within the valve element, where these four openings may be arranged at equal distances around the circumference.

According to another aspect a ceramic liner may be arranged between the valve element and the valve housing. The ceramic liner may then be formed with the same number of openings and or grooves as in the housing.

According to the invention there is also provided a system for pressurizing a fluid with the use of a motive fluid. The fluid to be pressurized may be liquid and the motive fluid may be a gas. There is in the system provided a valve arrangement as explained above with the supply port connectable to a source of a motive fluid and the exhaust port connectable to a dumping space for the motive fluid, and at least one pressure transferring unit connected to the at least one outlet/inlet opening for transferring pressure from the motive fluid to a fluid to be pressurized.

According to one aspect, the pressure transferring unit may be an accumulator, a gas driven liquid pump, a piston arrangement, a membrane pump system, a hose, or any other element which may transfer pressure from one fluid to another fluid.

According to one aspect of the invention, there may be one pressure transferring unit connected to each set of outlet/inlet openings. And in one embodiment there may be four sets of inlet/outlet openings connected to four pressure transferring units. The pressure transferring units will then be in different states as the valve element is rotated relative to the valve housing, and in different states compared with each other. This gives a more even supply of pressurized fluid from the system. There may be more than four inlet/outlet opening sets and pressure transferring units, or less, but the latter might give a less even supply of pressurized fluid, of course dependent on the rotational speed of the valve element relative the valve housing. In another possible embodiment there may be two pressure transferring units connected to each set of inlet/outlet openings, which then forms two sets of pressure transferring units which are operated in parallel.

BRIEF DESCRIPTION OF THE DRAWINGS

The invention will now be explained with non-limiting embodiments and with reference to the attached drawings, where:

FIG. 2 shows a part longitudinal cross section through the valve arrangement;

FIG. 3 shows a see-through view of the valve arrangement;

FIGS. 4a-4d show four cross sections through the valve arrangement at different axial positions.

DETAILED DESCRIPTION OF THE INVENTION

Figure 1:
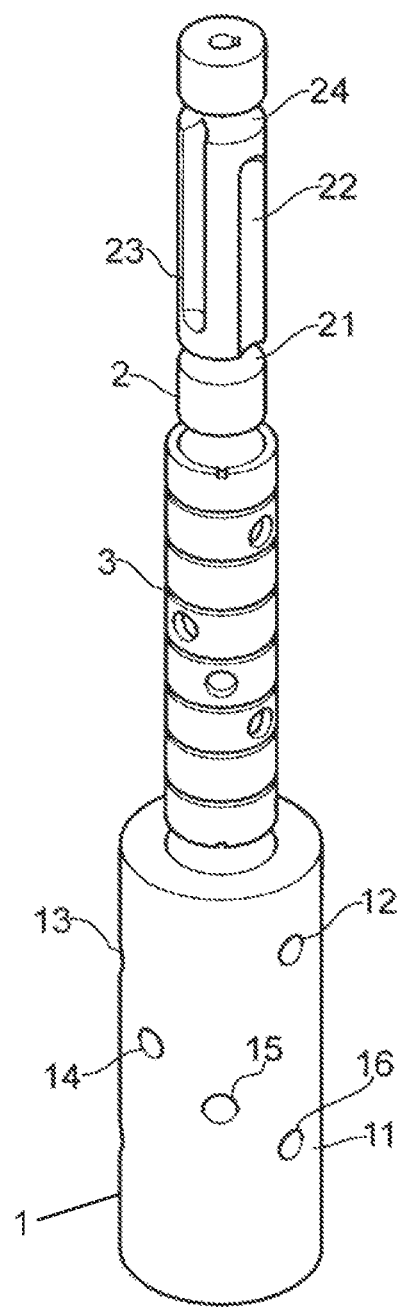
FIG. 1 shows an exploded view of a valve arrangement according to the invention.

In FIGS. 1-3 the valve arrangement of the present invention is shown to comprise a valve housing 1, a valve element 2 and a ceramic liner 3.

The valve element 2 has an outer mainly cylindrical shape with a rotation axis 20 for rotation of the valve element 2 relative the valve housing 1 to operate the valve in different positions. Close to one end of the cylindrical shape there is in the outer surface of the valve element formed a first circumferential groove 21. Two first bores 22, whereof one is shown in FIG. 1, extend from this circumferential groove 21 for a distance mainly parallel to the rotation axis 20 along the valve element. This first bore 22 is formed as a groove in the outer surface of the valve element. Close to an end of the valve element 2 opposite the end with the first circumferential groove 21, there is arranged a second circumferential groove 24. The first bores 22 are not connected to this second circumferential groove 24. Parallel to these first bores 22 there is arranged two second bores 23, whereof one is shown in FIG. 1. These second bores 23 extend from the second circumferential groove 24 a distance along the valve element 2, in the direction towards the first circumferential groove 21, but not all the way. Around a circumference between the circumferential grooves, when seen in a longitudinal direction, there are alternating first and second bores in the outer surface of the valve element.

When the valve element 2 is positioned within the housing 1, the first circumferential groove 21 is aligned with two supply ports 11 arranged as through-going openings in the housing 1. With the circumferential groove 21 only one supply port 11 would be sufficient, but two supply ports make the system even more pressure balanced. The second circumferential groove 24 in the valve element is aligned with two exhaust ports 12 in the housing 1 when the valve element 2 is positioned within the housing 1, as can be seen in FIG. 2. Between the supply ports 11 and the exhaust ports 12 there are in the shown embodiment arranged four sets of inlet/outlet openings 13, 14, 15, 16 in the valve housing 1, as can be seen in FIG. 3. These sets of inlet/outlet openings are arranged at different positions along the rotation axis of the valve element and also at different angles around the rotation axis, as best shown in FIG. 1 and FIGS. 4a-4d. FIGS. 4a, 4b, 4c and 4d show four cross sections at different positions along the rotation axis of the valve element 2, taken at positions of each set of inlet/outlet openings 13, 14, 15, 16 in the housing 1 for one position of the valve element 2 relative the valve housing 1.

As can be seen from the figures, when the valve element 2 is in one position relative to the housing 1, the supply port 11 is connected to one inlet/outlet set, namely, the second inlet/outlet set 14. This occurs as the valve element 2 is rotated to a position relative to the housing such that the first bore 22, which is always connected to the supply port 11 and in the shown embodiment is formed in the outer surface of the valve element, is aligned with the second inlet/outlet set 14, as shown in FIG. 4b. The second bore 23 is at the same time aligned with the fourth set of inlet/outlet openings 16, as shown in FIG. 4d. The fourth set of inlet/outlet openings 16 is thereby connected to the exhaust port 12. The first and third sets of inlet/outlets 13, 15 are positioned in the housing such that neither the first bore 22 nor the second bore 23 is in contact with these sets of openings, thereby closing these openings, as shown in FIGS. 4a and 4c.

When the valve element 2 is rotated 45 degrees within the housing in relation to what is shown in FIGS. 4a-4d, the first and second bores 22, 23 will be in contact with the first and third inlet/outlet openings sets 13, 15, while the second and fourth sets 14, 16 are closed. And, when the valve element 2 is rotated 45 degrees further, the first bore 22 will be in contact with the fourth set 16 and the second bore 23 will be in contact with the second set 14.

In the illustrated embodiment there are shown sets of two openings or ports. However, it is possible to form the valve arrangement with only one opening or port in one set, or it is possible to form the valve arrangement with three, four or eight openings or ports around the circumference. By having sets with more than one opening or port, there is the possibility of having the valve arrangement pressure balanced.

Figure 5:
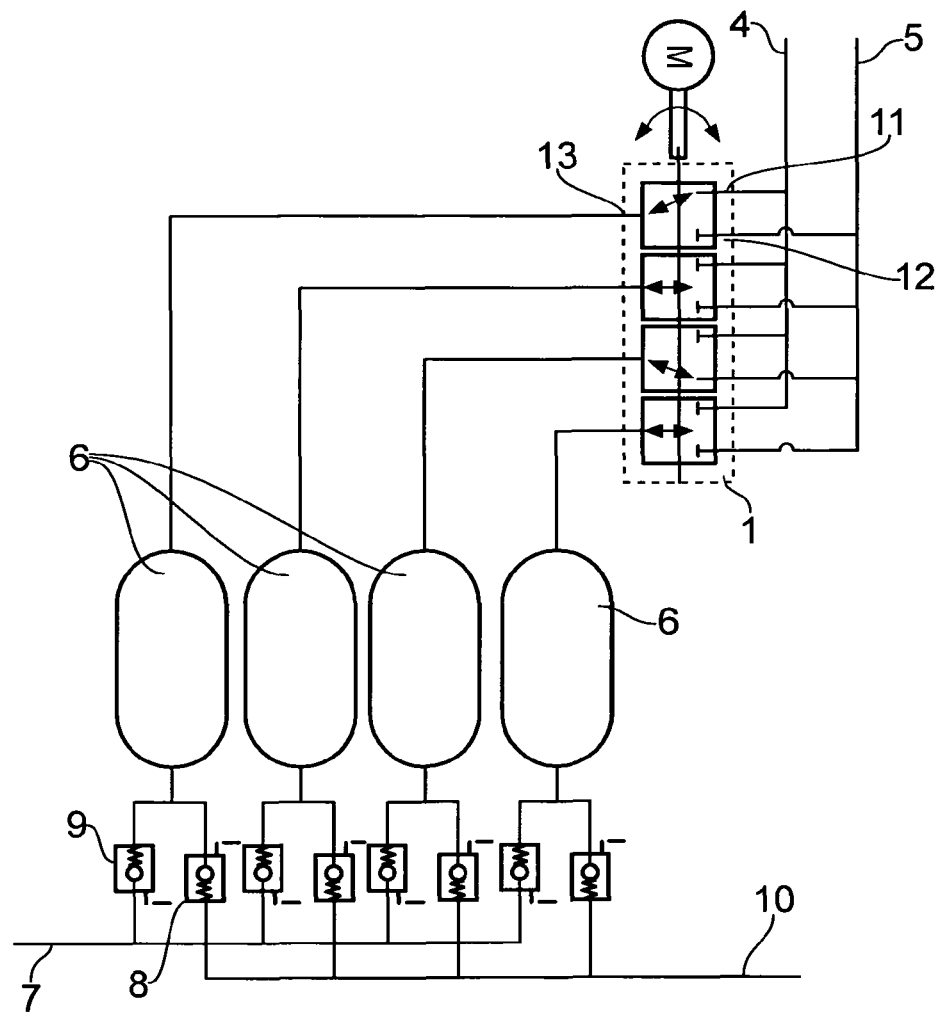
FIG. 5 shows a pressurizing system using the valve arrangement.

In FIG. 5 there is shown one application where the valve arrangement may be used. The figure shows a system for providing pressure in a liquid without the use of a normal pump. There are in the system shown four pressure transforming units 6, which in this case are four accumulators 6. The accumulators 6 are all separately connected to a low pressure liquid line 7 with an inlet check valve 9 in this connection, and they are all also connected to a high pressure liquid line 10 with an outlet check valve 8 in that connection. The inlet check valve 9 only allows fluid to flow from the low pressure liquid line 7 and into the accumulators 6 when there is a given pressure difference between the low pressure line and the accumulator. When the pressure is higher in the accumulator, this inlet check valve 9 will be closed. The outlet check valve 8 only allows fluid to flow out of the accumulator 6 when the pressure within the accumulator 6 has reached a given higher pressure, compared with the pressure within the high pressure liquid line 10. There are inlet check valves 9 and outlet check valves 8 for each of the accumulators 6.

The accumulators 6 are also connected to a valve arrangement according to the invention for providing a motive gas in the accumulators. The valve arrangement is connected to a motive gas supply fluid line 4, a motive exhaust fluid line 5, and a motor/control arrangement M for rotating the valve element relative to the housing.

A gas is fed through the gas supply line 4 through a supply port in the valve housing. The gas is then lead through the circumferential groove and the first bore, dependent on the relative rotational position of the valve element within the housing, out through one inlet/outlet port in the valve housing and through to one of the accumulators 6. Possibly at the same time another accumulator 6 is connected to the motive exhaust fluid line 5 through another inlet/outlet port, the second bore, the second circumferential groove and the exhaust port.

As the valve element is rotated, the inlet/outlet port of one set forms in a first position a connection between the motive supply fluid line 4 and the accumulator 6, in a second position closes this connection, in a third position opens a connection between the motive exhaust fluid line 5 and the accumulator 6, and in a fourth position closes this connection. After this the valve element is rotated to a fifth position where the accumulator again is connected to the motive supply fluid line, or this may be the first position, both starting the sequence of connecting to the motive fluid line, closing this connection, connecting to the exhaust fluid line, and closing that connection, again as the valve element is rotated relative the valve housing.

As there are four accumulators and also four inlet/outlet opening sets, an accumulator goes through the steps of being pressurized by adding motive fluid and then providing pressurized fluid out of the accumulator and into the high pressure liquid line, being depressurized as it is connected to the exhaust line, and then allowing lower pressure liquid into the accumulator. The four accumulators 6 and the valve arrangement are arranged such that each accumulator is in another step of the sequence compared to the other accumulators. This gives the situation where there are few and minor, if any, pressure pulses in the high pressure liquid line, because when one accumulator is finishing its step of providing higher pressure liquid another comes into this step.

The invention has now been explained with reference to non-limiting embodiments. A skilled person will understand that alternations and modifications may be made to the shown embodiments that are within the scope of the invention as defined in the attached claims. For instance the valve element may be formed with four first and second bores and then four inlet/outlets in each set in the valve housing. This provides another frequency on the switch between the different positions in the sequence with the same rotation speed of the valve element relative the housing. There may be more or fewer than four inlet/outlet openings sets. The first and second bore may be formed as bores within the valve elements instead of as grooves in the outer surface. Then the supply port and the exhaust port do not need to be on opposite sides of the group of inlet/outlet opening sets. There is also the possibility that an inlet outlet/opening set is connected to two pressure transferring units which are operated in parallel.

What is claimed is:
1. A valve arrangement comprising:
a housing; and
a mainly cylindrical valve element arranged rotatable within the housing;
the housing comprising at least one supply port, at least one exhaust port and at least three sets of two outlet/inlet openings, the supply and exhaust ports being arranged at a distance from each other and the sets of outlet/inlet openings along a rotation axis of the valve element;
the valve element comprising at least two first bores arranged on opposite sides of the valve element, the first bores extending parallel to the rotation axis and connecting the supply port with a first set of outlet/inlet openings in a first position of the valve element;
the valve element further comprising at least two second bores arranged on opposite sides of the valve element, the second bores extending parallel to the rotation axis and connecting the exhaust port with a second set of outlet/inlet openings in the first position of the valve element;
wherein the first and second bores are separated from each other and are configured such that the first bores connect the supply port with the second set of outlet/inlet openings in a second position of the valve element and the second bores connect the exhaust port with the first set of outlet/inlet openings in the second position of the valve element;

wherein at least a third set of outlet/inlet openings is closed by the valve element in both the first and second positions of the valve element and is connected to either said first bores or said second bores in a third position of the valve element; and wherein the valve arrangement comprises a first circumferential groove connecting the supply port with the first bores in every operational position of the valve element and a second circumferential groove connecting the exhaust port with the second bores in every operational position of the valve element.

2. The valve arrangement according to claim 1, wherein the at least one set of outlet/inlet openings is arranged between the supply port and the exhaust port as seen along the rotation axis of the valve element.

3. The valve arrangement according to claim 1, wherein the first and second bores are formed as grooves in an outer surface of the valve element.

4. The valve arrangement according to claim 1, wherein the first and second circumferential grooves are formed in the valve element.

5. The valve arrangement according to claim 1, wherein the first set of outlet/inlet openings is connectable to a first unit and the second set of outlet/inlet openings is connectable to a second unit, the first set of outlet/inlet openings being staggered around the housing in relation to the second set of outlet/inlet openings, thereby leading fluid towards the first unit in the first position of the valve element and then the second unit in the second position of the valve element.

6. The valve arrangement according to claim 1, wherein the housing comprises one set of two supply ports and one set of two exhaust ports, and wherein the supply ports, the exhaust ports and the outlet/inlet openings of each of the at least three sets are arranged around the circumference of the valve element generally opposite each other.

7. The valve arrangement according to claim 1, further comprising a ceramic liner arranged between the valve element and the valve housing.

8. A system for pressurizing a fluid with the use of a motive fluid, comprising:

a valve arrangement which includes a housing and a generally cylindrical valve element rotatably positioned in the housing;

the housing comprising at least one supply port, at least one exhaust port and at least three sets of two outlet/inlet openings, the supply and exhaust ports and the sets of outlet/inlet openings being axially spaced from each other;

the valve element comprising at least two longitudinal first bores which are located on opposite sides of the valve element and which connect the supply port with a first set of outlet/inlet openings in a first position of the valve element, and at least two longitudinal second bores which are located on opposite sides of the valve element and which connect the exhaust port with a second set of outlet/inlet openings in the first position of the valve element, the first and second bores being separated from each other and configured such that the first bores connect the supply port with the second set of outlet/inlet openings in a second position of the valve element and the second bores connect the exhaust port with the first set of outlet/inlet openings in the second position of the valve element;

wherein at least a third set of outlet/inlet openings is closed by the valve element in both the first and second positions of the valve element and is connected to either said first bores or said second bores in a third position of the valve element;

the valve arrangement further comprising a first circumferential groove connecting the supply port with the first bores in every operational position of the valve element and a second circumferential groove connecting the exhaust port with the second bores in every operational position of the valve element;

wherein the supply port is connectable to a source of the motive fluid and the exhaust port is connectable to a dumping space for the motive fluid; and wherein at least one pressure transferring unit is connected to at least one set of outlet/inlet openings for transferring pressure from the motive fluid to the fluid to be pressurized.

9. The system according to claim 8, wherein the pressure transferring unit is an accumulator.

10. The system according to claim 8, wherein a respective pressure transferring unit is connected to each set of outlet/inlet openings.

* * * * *